United States Patent [19]

Rhoades

[11] Patent Number: 4,754,115

[45] Date of Patent: Jun. 28, 1988

[54] HIGH SPEED ELECTRICAL DISCHARGE MACHINING BY REDRESSING HIGH RESOLUTION GRAPHITE ELECTRODES

[75] Inventor: Lawrence J. Rhoades, Pittsburgh, Pa.

[73] Assignee: Extrude Hone Corporation, Irwin, Pa.

[21] Appl. No.: 838,723

[22] Filed: Mar. 11, 1986

Related U.S. Application Data

[63] Continuation of Ser. No. 713,547, Mar. 19, 1985.

[51] Int. Cl.$^4$ ............................................. B23H 7/22
[52] U.S. Cl. ................................ 219/69 E; 51/59 SS;
204/224 M; 219/69 V
[58] Field of Search ............... 219/69 E, 69 V, 69 M;
51/58, 59 SS, 60, 64, 157, 165.87; 204/224 M

[56] References Cited

U.S. PATENT DOCUMENTS

| | | | |
|---|---|---|---|
| 3,122,628 | 2/1964 | Inoue | 219/69 V |
| 3,885,353 | 5/1975 | Ota et al. | 51/165.87 |
| 3,988,864 | 11/1976 | O'Connor | 219/69 V |
| 4,100,701 | 7/1978 | Bessaguet | 51/157 |
| 4,132,038 | 1/1979 | O'Connor | 219/69 V |
| 4,236,985 | 12/1980 | Grodzinsky et al. | 219/69 V |
| 4,277,915 | 7/1981 | Hausermann et al. | 219/69 V |
| 4,464,866 | 8/1984 | Smith et al. | 51/165.87 |
| 4,497,101 | 2/1985 | Schrader | 219/69 E |
| 4,596,066 | 6/1986 | Inoue | 219/69 M |

FOREIGN PATENT DOCUMENTS

| | | | |
|---|---|---|---|
| 58-15630 | 1/1983 | Japan | 219/69 G |
| 1408801 | 10/1975 | United Kingdom | 219/69 E |
| 1526485 | 9/1978 | United Kingdom | 219/69 E |

OTHER PUBLICATIONS

"Tooling for Multiple Lead Applications of Electrical Discharge Machining", ASE Meeting Oct. 7-11, 1968, by Seborg.

Primary Examiner—A. D. Pellinen
Assistant Examiner—Geoffrey S. Evans
Attorney, Agent, or Firm—James S. Waldron

[57] ABSTRACT

An EDM apparatus for high speed machining of a workpiece and redressing of a graphite electrode by an ultrasonic machining tool or a total form machining tool. When the electrode becomes worn the workpiece clamped on a table (1) is shifted away by a slideway mechanism (4) so that a master on another table (2) confronts the worn electrode. The electrode is then redressed and the workpiece is slid back into position by the slideway mechanism (4) for more machining by the redressed electrode.

4 Claims, 1 Drawing Sheet

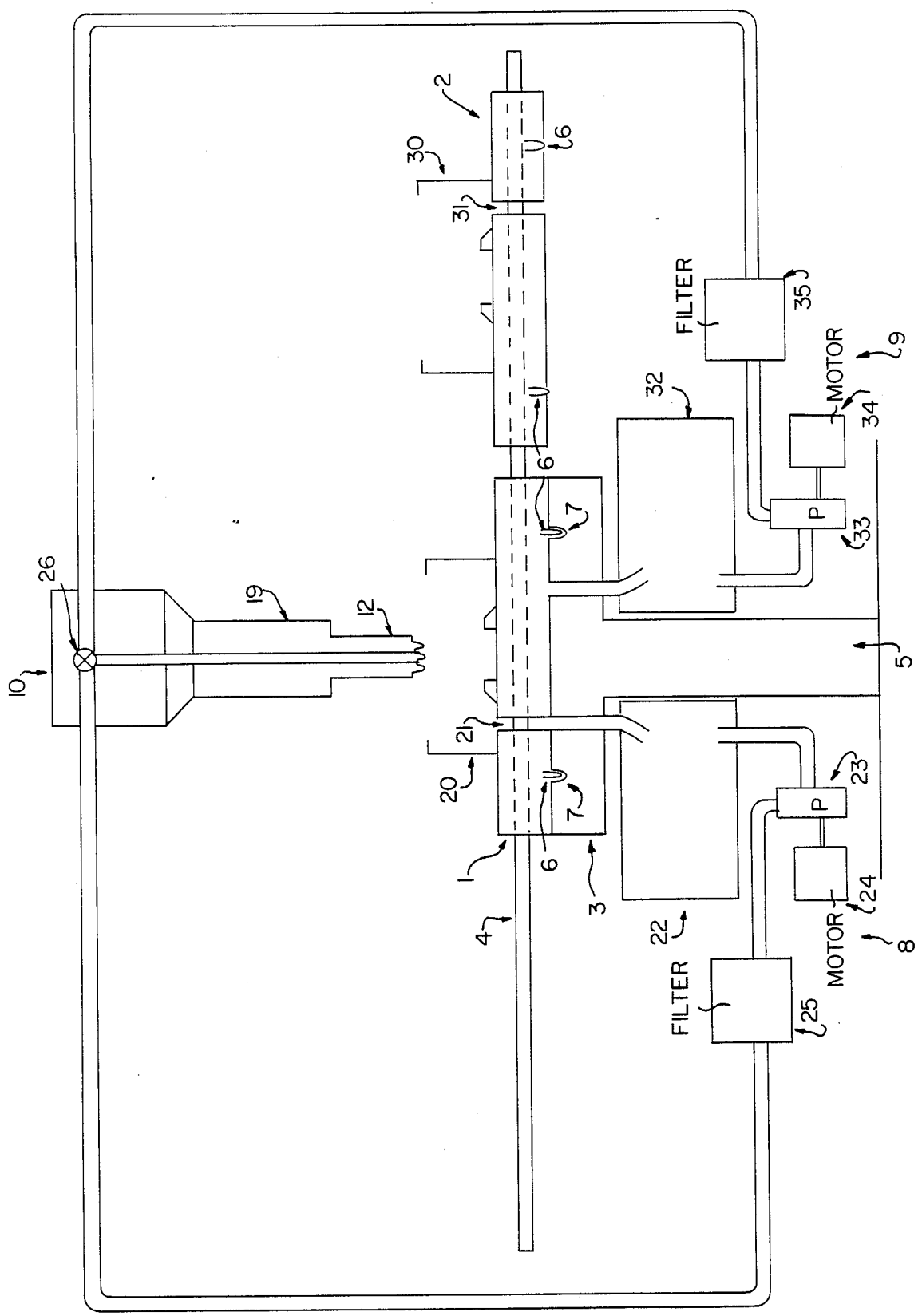

HIGH SPEED ELECTRICAL DISCHARGE MACHINING BY REDRESSING HIGH RESOLUTION GRAPHITE ELECTRODES

This is a continuation of application Ser. No. 713,547, filed Mar 19, 1985.

BACKGROUND OF THE INVENTION

Electrical discharge machining has grown to be the preferred machining technique for a variety of production machining procedures, including the production of molds, dies, and complex three-dimensional workpieces, particularly those of difficult to machine materials. The efficiency and accuracy of the technique have had continuous attention and upgrading, and have increased substantially since inception.

The broad acceptance of electrical discharge machining in the context of complex shapes and difficult to work materials has not led to the still broader application to easier shapes and easier materials despite substantial theoretical advantages. In particular, the excessive levels of electrode wear pose economic limits on the applicability of electrical discharge machining, so that only the most demanding operating justify and warrant the expense and inconvenience of these procedures.

High rates of electrode wear are to a large extent inherent in the electrical discharge machining operation itself, although through the years a number of techniques have been developed or have evolved to reduce the rate of electrode wear in relation to metal removal on the workpiece. These steps have, however, met a limit. If electrical discharge machining parameters are chosen to keep electrode wear to the minimal levels attainable, often referred to in the art by the misnomer "zero wear conditions" in a collective conspiracy of wishful thinking, the electrode will still have one part wear for each one hundred parts of stock removal from the workpiece. Electrode wear is not ordinarily uniform In the usual context, it is not uncommon to require more than one electrode for each workpiece, or in some few cases, a few workpieces can be machined before the elecrode is so far out of tolerance as to be unusable.

Becuase electrode wear is the single greatest limitation of electrical discharge machining, operational parameters are normally set to "no wear" conditions to conserve the electrode as much as possible. While the functional life of the electrode can be prolonged by such techniques, they come at the expense of the time of the electrical discharge machining operation.

The major benefit of all this is the relative ease of making the graphite electrodes by conventional machining techniques. In fact, it is the ease of machining, along with the excellent electrical and thermal properties which have led to the emergence of graphite electrodes as the best electrical discharge machining cutting tools, to the practical exclusion of other electrode materials, such as a variety of metals.

The usual procedures of machining an electrode are no different from any other machining procedure, and are substantially the same as would be required to make a workpiece, except that the graphite is rather easy to work and the electrode configuration is a mirror image of the desired workpiece to be formed by electrical discharge machining. As a result, the electrode represents a considerable investment. Either machining new electrodes or re-machining of used electrodes to re-establish dimensions lost and worn away by use represent significant time and cost. While the ease of machining graphite produces a significant savings, the extent of the benefit is primarily dependent on the workpiece material. The more difficult the workpiece is to machine by conventional machining operations, the greater the savings of electrical discharge machining operations.

Given the considerable time and cost invested in the making of electrical discharge machining electrodes, it is easy to understand the willingness of the art to tolerate the slow and less than optimum requirements of "no wear" conditions during the electrical discharge machining operation. If only "no wear" meant that there was, in fact, very litte wear, such a result would be tolerable, but the one percent wear rate is in practice quite substantial and, given any alternative, quite unacceptable.

BRIEF DESCRIPTION OF THE DRAWINGS

The FIGURE is a schematic view of our EDM machine fitted with ultrasonic machining for making and redressing graphite EDM electrodes.

SUMMARY OF THE INVENTION

In the present invention, greatly improved electrical discharge machining operations are made possible by the provision of fast and simple redressing of the graphite electrical discharge machining electrodes, permitting high speed machining operations, i.e., at high power operation of the electrical discharge machining; the redressing operation and cutting operations are alternated in a cycle on a schedule appropriate to maximum productions efficiency determined by balancing machining cutting rate against electrode wear and redressing time requirements. The procedure is simple to optimize.

Effectiveness of the present invention lies in the provision of a machine with the capability of rapid redressing of the graphite electrodes at high levels of accuracy and efficiency, in alternation with the electrical discharge machining operation. This result is attained by either of two techniques which lend themselves to the particular requirements.

Ultrasonic machining techniques are the basis of one embodiment while orbital mechanical grinding is the basis of the other specific embodiment. Both embodiments of the invention are disclosed in detail in the present specification.

DETAILED DISCLOSURE OF THE INVENTION

The major parameters which are available to the user of the EDM techniques are the selection of electrode material, discharge current duty cycle, current density and polarity.

It is well known that each of these parameters has a substantial impact on cutting rate, electrode wear, and the resolution of fine detail in the resulting workpiece.

The choice of electrode materials is first between graphite and metals. In general terms, the conventional wisdom has been that graphite electrodes cut about ten times faster than metal electrodes and are much easier to make, but that graphite electrodes are far more fragile and susceptible to wear and erosion, resulting in a loss of fine detail and workpiece resolution.

Metal electrodes can withstand a discharge current duty cycle where the current is on for a substantially longer time than it is off. Graphite electrodes require greater off-time. Metal removal rates is EDM operation increase with reducing off-time, while electrode wear rates generally decrease with reduce off-time. For all electrodes, the duty cycle in selected which will minimize the off-time while maintaining stable gap conditions.

The amperage of the discharge current is dependent on the duty cycle frequency and electrode size. Metal erosion rates and electrode wear both increase with increasing current density. For electrodes having two or three dimensional form, the maximum current density for metal electrodes is on the order of about 6 to 8 amp-cm$^{-2}$, while for graphite electrodes the maximum is generally on the order of about 10–15 amp-cm$^{-2}$. The usual "no wear" conditions are often only about 10 to 15 percent of these values, and rarely more than 25 to 30 percent.

In circumstances where electrode wear is of no importance, as in hole cutting with "one-dimensional" electrodes of less than about 0.5 cm$^2$, maximum cutting rates are attained at current densities of up to about 30 amps-cm$^{-2}$. Electrical discharge machining of exotic materials, such as carbides, often requires that the electrode be negative. Metal removal rates are often doubled when the electrode has negative polarity, but the wear rate is very much increased, often more than doubled.

While there are a number of additional variable parameters controllable by the EDM operator, the foregoing are the ones of greatest concern to the present invention.

The object of the present invention is to maximize EDM productivity by selecting EDM operational parameters to achieve such a result without specific regard for electrode wear. The present invention provides for form machining by EDM techniques at high speed, comparable to "one-dimensional" EDM operations, without loss of fine detail and resolution in the workpiece.

Conditions of EDM operations in the present invention are those which maximize metal removal in the workpiece, using graphite electrodes, selecting a duty cycle with vrey low off-time, a very high current density, and usually with the electrode having negative polarity.

As an example of the consequences, EDM of tool steel with a graphite electrode at "no wear" conditions of positive polarity and a current density of 3.12 amps-cm$^{-2}$ provided a metal removal rate at the maximum of 25 in$^3$-hr$^{-1}$. In constrast, the same system with negative polarity and current density increased to 25 amps attained a cutting rate of 400 in$^3$-hr$^{-1}$.

In the present invention, the result is very high metal removal from the workpiece and an electrode wear rate which is also high. Such operations have heretofore been considered unworkable and impracticable for use because the electrode wear has resulted in unacceptable loss of fine detail and resolution in the workpiece.

This erosion of the electrode can now be accomodated by high speed redressing of the electrode form to restore its condition. By periodic interruption of the EDM operation to permit restoration of the electrode even the most complex of three-dimensional shapes can be machined to very close tolerances and fineness of detail with the excellent surface finishing usual to EDM procedures. Redressing of the electrode can now be performed at speeds which made the operation as a whole dramatically faster than "no wear" conditions, with no loss of tolerances or detail.

The surface finish of high speed EDM is very slightly inferior to the finish attained under "no wear" conditions. In cases where such efforts are warranted, a brief finish period with a freshly dressed electrode under suitable parameters, such as "no wear" conditions can attain a very high level of finish. Such steps may not be required when the workpiece is to be polished after completion of the machining operation or where some surface roughness can be tolerated.

This type of EDM operation is possible only with high speed reforming of the graphite electrodes to exact tolerances. The techniques previously available to the art were too slow and too unexact to permit effective redressing during the machining process and it was usual to employ a great plurality of electrodes in such operations so that as each electrode becomes excessively worn, it was simply replaced. Remachining of worn electrodes was substantially the same as manufacturing and was comparable in the time and effort required.

Through improvements in electrode forming techniques, even the most complex electrode shapes may now be redressed to very exacting precision in very brief times, on the order of ten to thirty minutes, say, rather than four to ten hours by earlier techniques.

The techniques which permit high speed redressing are based on recent developments in non-traditional machining of the types known as total form machining or "TFM" and ultrasonic machining or "USM".

Both these techniques have found broad acceptance for a variety of applications, including making of EDM electrodes of graphite. In addition, both have been combined with EDM in simultaneous operations in some circumstances. Both these expedients are contemplated in the present invention and are entirely consistent with it, although neither is essential.

In ultrasonic machining, a transducer tool is formed in the approximate shape of a negative image of the desired workpiece, i.e., in this invention, an EDM electrode. The tool shape is not exactly that of the workpiece, but rather is offset to allow a space between the tool and workpiece. If orbital motion is to be provided, as discussed infra, further offset is provided to allow for orbiting.

The gap between the tool and the workpiece is filled with a liquid, usually water although other liquids may be employed, and abrasive particles. It is usual and ordinarily desirable to pump this working fluid into the gap and to remove it by suction to provide effective removal of machining debris.

The tool is advanced into the work and oscillated at appropriate sonic or ultrasonic frequencies at small amplitude. The tool may also be moved in an orbit relative to the workpiece. This technique ordinarily improves circulation of the abrasive fluid and flushing of debris and permits higher feed rates and material removal rates.

Machining is effected by a combination of the mechanical action of abrasive grains projected against the surface of the workpiece and cavitation in the liquid.

The present invention, in this embodiment, is facilitated by the fact that the approximate negative image of the graphite electrode which forms the ultrasonic machining transducer is an exact positive duplicate of the workpiece to be formed by the EDM process, so long as identical orbital motions are employed in both procedures. The abrasive gap of USM will be substantially the same as the EDM spark gap.

By virtue of this identity, formation of the ultrasonic tool is simply attained by molding techniques from a positive master form in known fashion and can thereafter be employed on a suitable adapted EDM machine to form and redress the graphite electrode in situ. The adaptations required will be those necessary to place and precisely locate and index the ultrasonic tool in relation to the graphite electrode and to drive the ultrasonic transducer when in place. A rotary turret operation or an indexing table may be employed as is well known in the art.

In use then, such an operation will entail forming an ultrasonic transducer as an exact replica of the ultimate workpiece required, placing the ultrasonic tool on the workpiece bed of the EDM machine, feeding a graphite block into the ultrasonic tool while driving the transducer and flushing with the abrasive slurry and thereby forming the graphite electrode. When the electrode is fully formed, the ultrasonic tool is withdrawn, abrasive flushed away, a workpiece ready for machining is fixed in place and EDM is begun.

As the electrode wears, it will reach a point where erosion dictates redressing to restore the electrode. The workpiece is removed and the ultrasonic tool is replaced. The electrode is advanced into the tool with abrasive flow, ultrasonic driving of the transducer, and orbiting, all as before. The time require for redressing will be dictated by the condition of the electrode, but will ordinarily be a small fraction of the original electrode forming. When the electrode is fully restored, EDM is resumed as before.

This cycle is repeated as often as required. It is often desirable, as conclusion of the EDM is approached, to give a final redressing, reverse the electrode polarity, and perform the final finishing cutting at reduced power to attain a finer surface finish. Generally, this finish operation will be not more than the final five percent or less of the material removal, or the last half-hour of machinery, whichever is less.

The relative times of EDM operation and redressing will vary with the complexity and detailing of the form of the electrode, the material being machined and the quality of the graphite material. It will generally fall into a range of 80 to 90 percent machining time and in some cases even more.

The USM embodiment is limited by the maximum size of ultrasonic transducer tools. Generally, these tools should not be greater than 10 cm in diameter.

An alternative, not so limited in size, is provided by mechanical orbital grinding, also known as total form machining or "TFM", where graphite electrodes are worked against an abrasive master by orbital motion, after coupled with oscillation on an axis normal to the plane of the orbit. Abrasive cutting of the graphite occurs over the entire form as the tool is ground into the graphite block. A flushing fluid to remove abraded graphite particles is normally provided.

As in the case of ultrasonic tools, a positive abrasive master will cut a negative image graphite electrode. In this case, however, the orbital grinding orbit must be greater by an appropriate amount than the orbit of the EDM to provide the appropriate spark gap. If no orbiting of the EDM electrode is desired, the abrasive master dimensions must be enlarged in the orbital plane by an amount equal to the orbit. Since this embodiment is simpler to implement, EDM equipment is even simpler to adapt, since no provision need be made for any features other than reliable and reproducable and proper orbiting.

Orbital grinding techniques are not limited to small sizes and the abrasive master is much simpler when compared to ultrasonic machining transducers. On the other hand, orbital grinding applies greater stress to the graphite so that there is an increased risk of damage or breaking, particularly with intricate detail, thin members, and the like. Orbital grinding cannot attain the fine detail resolution of ultrasonic machining.

The invention will be well understood in detail by reference to the FIGURE which shows a particularly preferred embodiment of the present invention. In this embodiment, the graphite electrode is both formed and redressed by ultrasonic machining, and the graphite electrode is employed in orbital electrical discharge machining of metal workpieces. These operations are performed in cycles as required in an integral machining operation on a single machine tool at high production rates.

The EDM tool shown in the FIGURE is based on a pair of work tables, 1 and 2, adapted to alternate in engagement with X-Y orbital drive table 3, via the slideway mechanism 4. The X-Y orbital drive table 3 is mounted on a rigid machine base 5, and is fitted with X-axis and Y-axis drive elements adapted to create an orbital movement of the drive table surface in the fashion will known to those of ordinary skill in the art. Work tables 1 and 2 engage table 3 in precise indexing relationship; while any suitable means for assuring proper registration and alignment of the work tables may be employed, it is preferred to use a plurality of tapered shot pins 6, which engage corresponding tapered pin holes 7. This technique is highly reliable, accurate, and reproducable as well as being quite simple and inexpensive.

The work tables 1 and 2 are very nearly identical. The major exception is that each table is supplied with a drain, that of EDM table 1 communicating with EDM dielectric supply means 8, while USM table 2 has a drain communicating with USM fluid supply means 9.

Above X-Y orbital drive table 3, ram means 10 is rigidly supported from machine elements (not shown) which are themselves rigidly supported by machine base 5. The ram means 10 is adapted to advance and restruct in an axis Y normal to the plane of the X-Y orbit of table 3, and carries ultrasonic transducer 19 which in turn carries graphite electrode 12.

Table 1 is adapted to fix and confine a workpiece within working tank 20. The workpiece is clamped into place with clamps 11 so that it will not move relative to table 1. Working tank 20 confines the flow of EDM dielectric via drain 21 to dielectric tank 22. Dielectric is circulated by dielectric pump 23, driven by electric motor 24, through filter 25, which removes from the fluid the metal removed from the workpiece. The filtered dielectric passes through conduits formed internally through the interior of graphite EDM electrode 12. This technique is well known to those of ordinary skill in the art to provide excellent flushing of the spark gap and to reduce arcing across the gap via removed metal debris which may otherwise accumulate in the gap. For the sake of clarity in the FIG., this flow path is not shown.

During the EDM phase of the cycle, machining is initiated by clamping a workpiece in place on table 1, and indexing table 1 in place on table 3, then starting dielectric circulation by starting electric motor 24, starting appropriately sized orbit of X-Y orbital table 3, bringing graphite electrode 12 into close proximity to the workpiece by activating ram 10, and activating the EDM current. The ram 10 is then advanced into the workpiece at a rate determined by the metal removal rate, until electrode wear mandates redressing the electrode. At that point, the steps are reversed to prepare for redressing.

With the ram 10 in its fully retracted position, indexing table 1 is removed from position by retracting it shot pins 6 and sliding it out of position on slide mechanism 4 to make room for redressing table 2 which is also mounted on slideway 4. When table 2 is in position, it is fixed in registration with graphite electrode 12 by its shot pins 6 which engage the female shot pin holes 7 on X-Y table 3. Flow of the EDM dielectric is prevented and flow of the abrasive slurry for the ultrasonic machining is activated by changing selector valve 26 to permit flow of abrasive slurry from USM slurry supply 9.

Table 2 is almost identical to table 1, except that it holds a master rather than a workpiece, and it is fitted with drain 31 which communicates with working tank 30 and with abrasive slurry tank 32. The slurry is circulated by slurry pump 33, driven by electric motor 24, through filter 35 which is sized to permit passage of the abrasive grains and to remove the generally coarser graphite debris from the USM operation.

It is also possible to provide an alternate technique for removing graphite from the abrasive slurry by flotation techniques by selection of a carrier medium in which the graphite will float to the surface while the abrasive will sink. By this technique, filter 35 is eliminated and means are provided to remove the graphite by skimmer means in slurry tank 32. This embodiment is not shown.

It should be noted that fine abrasive slurries can be passed through the internal passages within the graphite without excessive effect on the electrode since the pressures and the flow rates employed are very small compared to the effct of ultrasonic machining operation.

During the ultrasonic machining phase of the operating cycle, the master is first registered with the graphite electrode on table 2, abrasive slurry flow is started by activating elecric motor 34, the orbit is started on table 3, ram 10 is activated to bring the graphite into close proximity to the master. At this point, the ultrasonic transducer is started and the ram 10 advances the graphite electrode, i.e., the USM workpiece into the master at a rate determined by the graphite removal rate. This operation is continued until the electrode is again conformed to the working configuration required, when the above steps are reversed in order to prepare for the next EDM phase.

What is claimed is:

1. An electrical discharge machining and electrode redressing apparatus for high speed electrical discharge machining and electrode redressing comprising:
   A. an electrical discharge machining electrode mounted on and forming a part of said apparatus,
   B. an electrical discharge machine portion of said apparatus adapted to machine at high power applications and at high feed rates, said high power causing high rates of electrode wear and loss of machining resolution and accuracy, and
   C. a high speed electrode redressing portion of said apparatus adapted to redress electrodes to restore original levels of resolution and accuracy of said machining operation, and
   D. a means for providing relative movement of the electrical discharge and the redressing portions of the apparatus for an alternative co-action with said electrode, said apparatus being so configured such that said machining and redressing may be performed in an single, continuous cyclic operation.

2. The apparatus of claim 1, wherein the redressing portion is an ultrasonic machining tool.

3. The apparatus of claim 1, wherein the redressing portion is a total form of machining tool.

4. The apparatus of claim 1, wherein the electrode is graphite.

* * * * *